United States Patent [19]

Lundberg et al.

[11] 4,361,658
[45] Nov. 30, 1982

[54] PROCESS FOR POLYMERIC GELATION

[75] Inventors: Robert D. Lundberg, Bridgewater, N.J.; Dennis E. O'Brien, Katy, Tex.; Henry S. Makowski, deceased, late of Scotch Plains, N.J., by Patricia H. Makowski, executrix; Robert R. Klein, Berkeley Heights, N.J.

[73] Assignee: Exxon Research and Engineering Co., Florham Park, N.J.

[21] Appl. No.: 223,482

[22] Filed: Jan. 8, 1981

Related U.S. Application Data

[63] Continuation-in-part of Ser. No. 136,837, Apr. 3, 1980, Pat. No. 4,322,329, which is a continuation-in-part of Ser. No. 106,027, Dec. 21, 1979, Pat. No. 4,282,130.

[51] Int. Cl.³ .............................................. C08F 8/36
[52] U.S. Cl. .................................. 523/132; 524/916; 525/353
[58] Field of Search ............... 260/29.6 SQ; 525/353; 523/132

[56] References Cited

U.S. PATENT DOCUMENTS 2,813,087  11/1957  Roth ........................... 260/29.6 SQ
3,432,480   3/1969  Stratton ........................ 260/79.3 R
3,554,287   1/1971  Eilers ........................... 260/29.6 SQ
3,557,357   5/1971  Winkler ............................. 525/353
3,770,682  11/1973  Hubbard ......................... 260/29.7 B
3,809,959  10/1957  Roth ..................................... 526/31

Primary Examiner—Paul R. Michl
Attorney, Agent, or Firm—Richard E. Nanfeldt

[57] ABSTRACT

The present invention relates to a process for forming a polymeric solution or gel having a viscosity of at least about 50,000 cps which includes the steps forming a solvent system of an organic liquid and a polar cosolvent, the polar cosolvent being less than about 15 wt. % of the solvent system, a viscosity of the solvent system being less than about 1000 cps; dissolving to form a solution, a concentration of the neutralized sulfonated polymer in the solution being about 0.1 to about 20 wt. %, a viscosity of the solution being less than about 20,000 cps; and admixing or contacting said solution with about 5 to about 500 vol. % water, the water being immiscible with the solution and the polar cosolvent transferring from the solution phase to the water phase thereby causing the viscosity of said solution to increase rapidly from less to 20,000 cps to greater than 50,000 cps.

14 Claims, No Drawings

PROCESS FOR POLYMERIC GELATION

This is a CIP of Ser. No. 136,837, filed Apr. 3, 1980, now U.S. Pat. No. 4,322,329, which is a CIP of Ser. No. 106,027, filed Dec. 21, 1979 now U.S. Pat. No. 4,282,130.

BACKGROUND OF THE INVENTION

1. Field of the Invention

The present invention relates to a process for forming a polymeric solution or gel having a viscosity of at least about 50,000 cps which includes the steps forming a solvent system of an organic liquid and a polar cosolvent, the polar cosolvent being less than about 15 wt. % of the solvent system, a viscosity of the solvent system being less than about 1000 cps; dissolving to form a solution, a concentration of the neutralized sulfonated polymer in the solution being about 0.1 to about 20 wt. %, a viscosity of the solution being less than about 20,000 cps; and admixing or contacting said solution with about 5 to about 500 vol. % water, the water being immiscible with the solution and the polar cosolvent transferring from the solution phase to the water phase thereby causing the viscosity of said solution to increase rapidly from less than 20,000 cps to greater than 50,000 cps.

2. Description of the Prior Art

There are many applications for very viscous or gelled solutions of polymers in organic liquids which are quite diverse. There are also a number of physical and chemical techniques for preparing such systems. The present invention is concerned with a process for converting a relatively low viscosity organic liquid solution of an ionic polymer into a very viscous or gelled system via a rapid process which under certain conditions can be reversed. The potential applications for this process and the products derived therefrom will be evident in the instant application. Some of these applications are: for the formulation of greases; a process for filling asphalt pot holes; for the formulation of caulking materials; for the viscosifying of paint removers; a process for forming a jellied gasoline; a method of solidifying and stabilizing unstable sand or soil formations such as shale, a process for solidifying low viscosity hydrocarbons as a means for cleaning up oil spills; the creation of pond liners or similar elastic films, simply by impregnating a sand or soil formation, as an antivaporization coating for a pond, a process for viscosifying oils, the formulation of non-drip logs for file places, the blend with silica and hydrocarbons to create tough elastomers, the formation of gaskets for temporary applications, the creation of elastomeric films or coatings on a substrate; and the formation of extended films on water by spraying an oil-polymer solution over water, thereby extracting alcohol or cosolvent to create the film.

There are major problems in the direct preparation of viscous polymer solutions or gels via conventional techniques such as polymer dissolution. For example, attempts to form a high viscosity (>500,000 cps) solution of polystyrene in a suitable solvent such as xylene can be difficult. The levels of polymer required are either very high (20 to 50 wt. % concentration) or the molecular weight of the polymer must be extremely high. In either event the dissolution process is extremely slow even at elevated temperatures, and even then it is difficult to achieve homogeneous polymer solutions free of local concentrations of undissolved, or poorly dissolved polymer. Thus, the process of achieving such solutions can be difficult and the concentration of polymer in the solution to achieve high viscosities can be uneconomically high.

These are various chemical approaches to the solution of the problems outlined above, that is polymer chain lengthening reactions which can occur to give viscous solutions such as by the reaction of hydroxyl terminated polymers with diisocyanates etc. Such process have inherent disadvantages which preclude their use in the intended applications of this invention.

The instant invention describes a process which permits (1) the preparation of polymer solutions of sulfonated polymers in organic liquid having reasonably low viscosities (i.e., less than about 20,000 cps); (2) the preparation of extremely viscous solutions or gels from such solutions by a process of mixing or contacting water with the polymer solution and (3) the reversion of such viscous solutions or gells to relatively low viscosity mixtures by the reincorporation of polar cosolvents which are water immiscible at a later stage. These operations are achieved by the use of the appropriate concentration of polymers having low concentrations of ionic groups present, preferably metal sulfonate groups. Such polymers are described in detail in a number of U.S. Pat. Nos. 3,836,511; 3,870,841; 3,847,854; 3,642,728; and 3,921,021) which are herein incorporated by reference. These polymers possess unusual solution characteristics some of which are described in U.S. Pat. No. 3,931,021. Specifically such polymers such as lightly sulfonated polystyrene containing about 2 mole % sodium sulfonate pendant to the aromatic groups are typically not soluble in solvents commonly employed for polystyrene itself. However, the incorporation of modest levels of polar cosolvents permit the rapid dissolution of such ionic polymers to form homogeneous solutions of moderate viscosity.

In the instant process, the role of the polar cosolvent is that of solvating the ionic groups while the main body of the solvent interacts with the polymer backbone. For example, xylene is an excellent solvent for the polystyrene backbone and when combined with 5% methanol readily and rapidly will dissolve the previous example of lightly sulfonated polystyrene.

The remarkable and surprising discovery of the instant invention pertains to the following observation. When small (or large) amounts of water are combined and mixed with solutions of ionic polymers dissolved in such mixed solvent systems as those described above, it is possible to convert such low viscosity systems into extremely viscous gels or solutions. Indeed it is possible to achieve increases in viscosity by factors of $10^4$ (10,000) or more by the addition of only 5 to 15% water based on the polymer solution volume. This unusual behavior is postulated to arise from the removal of the polar cosolvent from the polymer solution phase into a separate aqueous phase. Consequently, when this occurs the physical crosslinking of the ionic groups is again manifested resulting in a tremendous increase in solution viscosity. The resulting gels or thick solutions appear quite homogeneous.

SUMMARY OF THE INVENTION

The present invention relates to a process for forming a viscous polymeric solution or gel having a viscosity of at least about 50,000 cps which includes the steps forming a solvent system of an organic liquid and a polar cosolvent, the polar cosolvent being less than about 15 wt. % of the solvent system, a viscosity of the solvent system being less than about 1000 cps; dissolving a neutralized sulfonated polymer in the solvent system to form a solution, a concentration of the neutralized sulfonated polymer in the solution being about 0.1 to about 20 wt. % a viscosity of the solution being less than about 20,000 cps; and admixing or contacting said solution with about 5 to about 500 vol. % water, the water being immiscible with the solution and the polar cosolvent transferring from the solution phase to the water phase thereby causing the viscosity of said solution to increase rapidly from less than 20,000 cps to greater than 50,000 cps. In some cases, the polymer solution may have other agents present such as clay, soil, sand, fillers, particulate solids, etc.

Accordingly, it is a primary object of the instant invention to describe an economical process for forming a highly viscous or gelled polymeric solution having a viscosity greater than about 50,000 cps preferably greater than 500,000 cps.

A further object of the instant invention is to provide a process for forming a gell solution which can be used as an encapsulating material, a coating material, as a means of forming a plug within a bore of an elongated member, or as a means of filling an opening in an article. In addition, this technique can be employed as an approach to join lubricating gels or greases which display a significant resistance to flow.

A still further object of the instant invention is to employ the instant process as an integral part of well control procedures which are initiated when unwanted pore fluid influxes have the wellbore from subterranean formations. A thin fluid solution, separated from the water base drilling mud by suitable fluid spacers, could be circulated down the drill pipe string and out through the jet nozzles in the drill bit. Upon contacting water in the drill pipe-formation annulus, a viscous gel would be formed that could prevent further pore fluid movement and avoid the risk of a catastrophic well blowout. This type of procedure would have several advantages over current, conventional well control methods which rely on the hydrostatic gradient of a heavy fluid placed in the annulus to control the well in the event of pore fluid influxes.

The creation of pond liners or elastic films impregnating the surface of a shallow depression in the earth can be described as follows. A sandy soil formation is impregnated with a hydrocarbon solution of sulfonated ionomer containing a water miscible cosolvent. This impregnated layer may be 1 to 100 mm thick. Water can be sprayed on run into the formation, and a resulting elastic film is created which is virtually impenetrable if sufficient polymer solution has been deposited on the formation. One of the characteristics of such films is that they will undergo some degree of creep, thereby creating a continuous film provided sufficient solution is sprayed on the formation. The consequent depression can then be filled with water forming a virtually permanent barrier for further diffusion of the contained water through the substrate.

A second concept involves the formation of elastic films on a water surface via the following mechanism. Hydrocarbon solution containing from 2 to 20 percent sulfonated ionomer and 1 to 10 volume percent cosolvent is sprayed over a body of water to form a reasonably thin film on the water surface. Immediately after deposition of the film the cosolvent will be extracted in the aqueous phase and resulting elastic film which is formed will serve to minimize the evaporation of the water. For this process to be optimal, it is desirable that the hydrocarbon be reasonably non volatile and could well be either a low volatility oil or some similar non volatile hydrocarbon based solvent. In addition, the presence of a small amount of surfactant in the polymer solution permits the preparation of very uniform thin coatings.

A third application for hydrocarbon gelation involves the preparation of high strength greases which are hydrocarbon continuous. In this application an oil containing from 2 to 10 weight percent sulfonated ionomer plus a water miscible cosolvent (1 to 10 volume percent) is add-mixed with a low level of water (5 to 50 volume percent based on hydrocarbon content) and under shear the resulting mixture becomes an extremely viscous hydrocarbon continuous gel. Other components typically used in greases such as metal stearate or metal salts of other fatty acids can be incorporated along with fibers and other flow inhibitor components. The resulting greases will have a very high degree of viscosity characteristics and because they are hydrocarbon continuous, will maintain adequate corrosion and rust inhibition. Other inhibitors can be added to further enhance these characteristics.

A fourth application for these gelation concepts involves the process of shutting off an underground spring or aquifer. Often such water flows are undesirable during construction processes or mining operations. In this application a low viscosity hydrocarbon polymer solution containing water miscible cosolvent can be impregnated and the soil either through high pressure or by drilling appropriate holes into the solution dispersed within the underground formation. Again the extraction of the cosolvent aqueous phase sets up the strong ionic interactions which will terminate the flow of a water phase in the subterranean formation. There are many application for these concepts during mining operations, home construction operations, and the drilling of oil wells or natural gas wells where it is desirable to shut off a water stream either permanently or for short periods of time.

GENERAL DESCRIPTION

The present invention relates to a process for forming a polymeric solution having a viscosity of at least about 50,000 cps which includes the steps forming a solvent system of an organic liquid and a polar cosolvent, the polar cosolvent being less than about 15 wt.% of the solvent system, a viscosity of the solvent system being less than about 1000 cps; dissolving a neutralized sulfonated polymer in the solvent system to form a solution, a concentration of the neutralized sulfonated polymer in the solution being about 0.1 to about 20 wt %, a viscosity of the solution being less than about 20,000 cps; and admixing or contacting said solution with about 5 to about 500 vol. % water, the water being immiscible with the solution and the polar cosolvent transferring from the solution phase to the water phase thereby causing the viscosity of said solution to increase rapidly from less than 20,000 cps to greater than 50,000 cps.

The present invention further related to the formulation of greases; a process for filling asphalt pot holes; for the formulation of caulking materials, for the viscosifying of patent removers; and process for forming a jellied gasoline; a method of solidifying and stabilizing un-stable sand or soil formations such as shale, a process for solidifying low viscosity hydrocarbons as a means for cleaning up oil spills; the creation of pond liners or similar elastic films, simply by impregnating a sand or soil formation, as an antivaporization coating for a pond, a process for viscosifying oils, the formulation of non-drip logs for fire places, the blend with silica and hydrocarbons to create tough elastomers, the formation of gaskets for temporary applications, the creation of elastomeric films or coatings on a substrate; and the formation of extended films on water by spraying an oil-polymer solution over water, thereby extracting alcohol or cosolvent to create the film.

If the boiling point of the organic liquid is greater than that of the water or the polar cosolvent, the solution or gel having a viscosity greater than 50,000 cps can be heated to a temperature greater than the boiling point of the water and the polar cosolvent but less than that of the organic liquid thereby isolating a gel of the neutralized sulfolated polymer in the organic liquid, when the polar cosolvent and water are boiled off. The formed gel can be further heated to a temperature above the boiling point of the organic liquid thereby removing part of the organic liquid from the liquid so as to cause formation of a more rigid gel. Alternatively, the solution having a viscosity greater than 50,000 cps can be heated to a temperature above the boiling point of the organic liquid, polar cosolvent and water thereby removing the organic liquid water and polar solvent from said gel so as to cause formation of the solid neutralized sulfonated polymer. The gel can be coated onto a substrate of an article such as a cloth fabric, a polymeric material, glass, ceramic, metal or wood prior to the heating of the gel. When the gel is subsequently heated a solid neutralized sulfonated polymeric coating will form on the surface of the substrate. Alternatively, the gel could be placed into an opening of the article thereby forming a solid plug within the opening upon application of heat to the gel. The gel could also be placed into the bore of an elongated member such as a pipe thereby forming a plug in the pipe upon application of heat to the gel. The article could also be suspended in the solution having the viscosity of less than 20,000 cps and thereby be encapsulated in the solution having a viscosity greater than 500,000 cps, when the water is added to the solution having a viscosity of less than 20,000 cps.

When the solution having a viscosity greater than 50,000 cps is formed by the addition of water to the solution having a viscosity less than 20,000 cps, the polar cosolvent rapidly transfers from the solution or gel phase to the aqueous water which is immiscible with the solution phase. The water can be removed from the solution phase by conventional liquid extraction methods. The formation of the solution having a viscosity of 500,000 cps from the solution having a viscosity less than 20,000 cps can be quite rapid in the order of less than 1 minute to about 24 hours, more preferably less than 1 minute to about 30 minutes, and most preferably less than 1 minute to about 10 minutes, however, this depends on temperature, shear, solvent type, etc.

The component materials of the instant process generally include an ionomeric polymer such as a neutralized sulfonated polymer, an organic liquid, polar cosolvent, and water.

In general, the ionomeric polymer will comprise from about 10 to about 200 meq. pendant ionomeric groups per 100 grams of polymer, more preferably from 10 to 100 meq. pendant ionomeric groups. The ionic groups may be conveniently selected from the group consisting of carboxylate, phosphonate, and sulfonate, preferably sulfonate groups. The ionomers utilized in the instant invention are neutralized with the basic materials selected from Groups IA, IIA, IB, and IIB of the Periodic Table of the Elements and lead, tin, and antimony, as well as ammonium and amine counterions. Ionic polymers which are subject to the process of the instant invention are illimitable and include both plastic and elastomeric polymers. Specific polymers include sulfonated polystyrene, sulfonated t-butyl styrene, sulfonated ethylene copolymers, sulfonated propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers.

Neutralization of the cited polymers with appropriate metal hydroxides, metal acetates, metal oxides or ammonium hydroxide etc. can be conducted by means well known in the art. For example, the sulfonation process as with butyl rubber containing a small 0.3 to 1.0 mole % unsaturation can be conducted in a suitable solvent such as toluene with acetyl sulfate as the sulfonated agent such as described in U.S. Pat. No. 3,836,511. The resulting sulfonic acid derivative can then be neutralized with a number of different neutralization agents such as a sodium phenolate and similar metal salts. The amounts of such neutralization agents employed will normally be equal stoichiometrically to the amount of free acid in the polymer plus any unreacted reagent which still is present. It is preferred that the amount of neutralizing agent be equal to the molar amount of sulfonating agent originally employed plus 10% more to insure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected.

The degree of neutralization of said ionomeric groups may vary from 50 to 500 mole % preferably 90 to 200%. Most preferably it is preferred that the degree of neutralization be substantially complete, that is with no substantial free acid present and without substantial excess of the base other than that needed to insure neutralization. Thus, it is clear that the polymers which are utilized in the instant invention comprise substantially neutralized pendant groups, and in fact, an excess of the neutralizing material may be utilized without defeating the objects of the instant invention.

The ionomeric polymers of the instant invention may vary in number average molecular weight from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

It is evident that the polymers covered within this invention encompass a broad class of hydrocarbon polymer systems. It is important that these hydrocarbon polymer backbones (in the absence of the ionic groups) be soluble in the organic liquid whose viscosity is to be controlled. To achieve the desired solubility, it is required that the polymer to be employed possess a degree of polarity consistent with that solvent. This solubility relationship can readily be established by anyone skilled in the art simply by appropriate tests (e.g., Polymer Handbook, Edited by Brandrup and Immergut, Interscience Publishers, 1967, section IV-341). In the absence of appropriate polymer-solvent compatibility knowledge, this can be determined experimentally by observing whether the selected polymer will be soluble in the solvent at a level of 1 gm polymer per 100 ml solvent. If the polymer is soluble, then this demonstrates that it is an appropriate backbone for modification with ionic groups to achieve the objectives of this invention. It is also apparent that polymers which are too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially non-crystalline.

The preferred ionic copolymers for use in the instant invention, e.g., sulfonated polystyrene and substituted derivatives thereof, may be prepared by the procedures described in U.S. Pat. No. 3,870,841, filed Oct. 2, 1972, in the names of H. S. Makowski, R. D. Lundberg, and G. H. Singhal, hereby incorporated by reference.

The ionomeric polymers may be incorporated into the organic liquid at a level of from 0.1 to 20 weight % preferably from 1 to 15 weight %, most preferably from 2 to 15 weight % based on the organic liquid and the polar cosolvent.

Specific examples of preferred ionomeric polymers which are useful in the instant invention include sulfonated polystyrene, sulfonated poly-t-butyl styrene, sulfonated polyethylene (substantially noncrystalline), and sulfonated ethylene copolymers, sulfonated polypropylene (substantially noncrystalline), and sulfonated polypropylene copolymers, sulfonated styrenemethyl methacrylate copolymers, (styrene)-acrylic acid copolymers, sulfonated polyisobutylene, sulfonated ethylene-propylene terpolymers, sulfonated polyisoprene, sulfonated polyvinyl toluene, and sulfonated polyvinyl toluene copolymers.

The ionomeric polymers of the instant invention may be prepared prior to incorporation into the organic solvent, or by neutralization of the acid from a situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well known to those skilled in the art; i.e., coagulation, steam stripping, or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation, since in situ neutralization required preparation of the sulfonic acid in the organic liquid which is to be subjected to the instant process, or the acid form of the ionic polymer must be dissolved in said organic liquid. The latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability and maximum control over the final mixture of ionic polymer, polar cosolvent and organic liquid.

The organic liquids, which may be utilized in the instant invention, are selected with relation to the ionic polymer and vice-versa. The organic liquid is selected from the group consisting essentially of aromatic hydrocarbons, cyclic aliphatic ethers, aliphatic ethers, or organic aliphatic esters and mixture thereof.

Specific examples of organic liquids to be employed with the various types of polymers are:

| Polymer | Organic Liquid |
|---|---|
| sulfonated polystyrene | benzene, toluene, ethyl benzene, methylethyl ketone, xylene, styrene, ethylene dichloride, methylene chloride |
| sulfonated poly-t-butyl-styrene | benzene, toluene, xylene ethyl benzene, styrene, t-butyl styrene, aliphatic oils aromatic oils, hexane heptane decane, nonane, |
| sulfonated ethylene-propylene terpolymer | pentane, aliphatic and aromatic solvents, oils such as Solvent "100 Neutral", "150 Neutral" and similar oils, benzene, diesel oil, toluene, xylene, ethyl benzene, pentane, hexane, heptane, octane, isooctane, nonane, decane aromatic solvents, ketone solvents |
| sulfonated styrene-methyl-methacrylate copolymer | dioxane, halogenated aliphatics, e.g., methylene chloride, tetrahydrofuran, dioxane, halogenated aliphatics, e.g., methylene chloride |
| sulfonated polyisobutylene | saturated aliphatic hydrocarbons, diisobutylene, triisobutylene, aromatic and alkyl substituted aromatic hydrocarbons, chlorinated hydrocarbons, n-butyl ether, n-amyl, ether, methyl oleate, aliphatic oils, oils predominantly paraffinic in nature and mixtures containing naphthenic hydrocarbons "Solvent 100 Neutral", "Solvent 150 Neutral" and all related oils, low molecular weight polymeric oils such as squalene, white oils and process oils having 60% or less aromatic content |
| sulfonated polyvinyl toluene | toluene, benzene, xylene, cychlohexane, ethyl benzene, styrene, methylene, chloride, ethylene dichloride. |

The method of the instant invention includes incorporating a polar cosolvent, for example, a polar cosolvent, into the mixture of organic liquid and ionomer, to solubilize the pendant ionomeric groups. The polar cosolvent will have a solubility parameter of at least 10.0, more preferably at least 11.0 and is water miscible and may comprise from 0.1 to 40, preferably 0.5 to 20 weight % of the total mixture of organic liquid, ionomeric polymer, and polar cosolvent. The solvent system of polar cosolvent and organic liquid in which the neutralized sulfonated polymer is dissolved contains less than about 15 wt.% of the polar cosolvent, more preferably about 2 to about 10 wt.%, and most preferably about 2 to about 5 wt.%. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred but not required that the polar cosolvent be soluble or miscible with the organic liquid at the levels employed in this invention. The polar cosolvent is selected from the group consisting essentially of water soluble alcohols, amines, di-or trifunctional alcohols, amides, acetamides, phosphates, or lactones and mixtures thereof. Especially preferred polar cosolvents are aliphatic alcohols such as methanol, ethanol, n-propanol, isopropanol, 1, 2-propane diol, monoethyl ether of ethylene glycol, and n-ethylformamide.

The amount of water added to the solution of neutralized sulfonated polymer, organic liquid and polar cosolvent having a viscosity of less than about 20,000 cps, is about 5 to about 500 vol. % of water, more preferably about 10 to about 300 vol. % water, most favorably about 10 to about 200 vol. % water.

In the case of reversion of the polymeric gel by the addition of water immiscible polar cosolvent, the concentration of polar cosolvent added is about 0.5 to about 30 wt.%, more preferably about 1 to about 20 wt.%, and most preferably about 2 to about 10 wt.%.

DETAILED DESCRIPTION OF THE PREFERRED EMBODIMENT

EXAMPLE 1

Solutions were prepared at 5% (5 gm/100 ml) concentrations of 2 mole % sodium sulfonated polystyrene (S-PS) in 5% methanol/xylene (vol/vol) and 5% hexanol/xylene, and of sulfonated EPDM (about 1.0 mole % Zinc sulfonate) in 5% isopropanol/heptane and 5% methanol/xylene.

To 50 ml samples of each solution, varying percentage levels of water (by volume) were added while stirring rapidly with a high speed stirrer. Brookfield viscosities of the stock solutions and each sample after water addition were obtained at 25° C.

Viscosity data are summarized on Table 1 for the S-PS solutions; Table 2 for the sulfo-EPDM Solutions.
S-PS The addition of water to S-PS in methanol/xylene produces a milky solution or gel. Viscosity increases exponentially from about 8 cps for the stock solution to 384,000 cps with 14% water added. Beyond this level of water addition, solid gels were obtained with viscosities above the range of the Brookfield measuring capability. Excess water was seen to separate from the thickened solutions at water levels of 10% and above.

The solution viscosity of the S-PS in hexanol/xylene stock solution was considerably high (458 cps) than the methanol/xylene solution. The addition of 1 and 2% water resulted in milky solutions with slight increases in viscosity (612 cps at 2% water level). At a level of 14% water, viscosity has increases to only 914 cps. This experiment clearly demonstrates that the use of a water immiscible alcohol such as hexanol does not provide a gel as shown above with methanol.
Sulfo EPDM The solution of Sulfo EPDM in isopropanol/heptane displayed phase separation upon standing into two indistinct layers which made viscosity readings somewhat erratic. The addition of water followed by agitation permitted reproducible readings over a range of water levels. This solution, therefore, was examined by removing 50 ml samples, adding aliquots of water and stirring vigorously. At water addition levels of 6 to 12%, uniform viscous solutions resulted and viscosities were obtained. At levels of 14% water and above, gelation became too thick for viscosity measurements.

The solution of Sulfo EPDM in methanol/xylene was examined as above. Water was added to 50 ml samples at levels of 6, 8, 10 and 12%. Milky, thick solutions were obtained up to the 10% water level and viscosities obtained. At a level of 12% water solid gelation occurs.

The preceding experiments demonstrate conclusively that the process envisioned for these ionic polymers in mixed solvents is useful in preparing gels. It is also evident that this process is applicable to a number of different polymer backbones containing pendant metal sulfonate groups. For example, copolymers of butadiene or isoprene with metal sulfonate containing vinyl monemers would also be useful in this invention. The preferred level of metal sulfonate groups pendant to the polymer backbone is in the range of 10 meq/100 gm up to 200 meq/100 gm of polymer. Similarly, the level of polymer in the mixed solvent can be varied over a wide range which is from about 1 weight percent up to 20 weight percent. Similarly, the alcohol level varies from below 2 percent to less than 15 weight percent based on total solvent (hydrocarbon solvent and alcohol).

It has generally been observed that increasing the amount of water with the polymer solution increases the strength of the gel. Levels of water in excess of 50 volume percent have been employed successfully and higher levels can be employed. The preferred levels of water are not believed to be critical provided that levels of greater than 5 volume percent are employed (based on volume of hydrocarbon-alcohol solution).

In addition, to the variables delineated above, other additives can be employed to increase gel strength, if desired. For example, the addition of clays, fillers (calcium carbonate, zinc oxide), carbon black and the like can be employed to strenghten the gels.

The experiments described heretofore are concerned only with the preparation of a gel and not its reversion. It has been observed that the gels of the present invention can be dispersed simply by the addition of a polar cosolvent which is miscible with the hydrocarbon phase and immiscible with water. Thus, a gel formed from sulfonated polystyrene [5% of S-PS containing 2 mole % sodium sulfonate in methanol/xylene (15/5)] by mixing with about 40 vol. % water is a stiff gel. The addition of about 5 volume percent of hexanol-1 to the entire mixture followed by agitation provides a fluid emulsion of very low viscosity. This reverse process can be effected with those alcohols and polar cosolvents which are not water miscible and, therefore, are primarily dissolved in the hydrocarbon phase.

TABLE 1
VISCOSITIES OF SULFO-POLYSTYRENE SOLUTIONS* AT VARIOUS WATER CONTENTS WITH METHANOL AND HEXANOL AS COSOLVENTS

| Alcohol | 0% $H_2O$ RPM | Vis-UL | 1% $H_2O$ RPM | Vis-UL | 2% $H_2O$ RPM | Vis-#2 | 4% $H_2O$ RPM | Vis-#2 | 6% $H_2O$ RPM | Vis-#4 |
|---|---|---|---|---|---|---|---|---|---|---|
| Methanol | 60 | 7.7 | 12 | 40.6 | 60 | 403 | 1.5 | 10,360 | 12 | 33,350 |
|  | 30 | 7.4 | 6 | 39.4 | 30 | 402 | .6 | 9,900 | 6 | 33,000 |
|  | 12 | 6.5 | 3 | 39.4 | 12 | 350 | .3 | 10,000 | 3 | 32,000 |

| | RPM | Vis-#1 | RPM | Vis-#2 | RPM | Vis-#2 | RPM | Vis-#2 | RPM | Vis-#2 |
|---|---|---|---|---|---|---|---|---|---|---|
| Hexanol | 12 | 458 | 30 | 570 | 30 | 612 | 30 | 654 | 30 | 705 |
|  | 6 | 460 | 12 | 570 | 12 | 600 | 12 | 655 | 12 | 705 |
|  | 3 | 464 | 6 | 570 | 6 | 590 | 6 | 660 | 6 | 690 |

| Alcohol | 8% $H_2O$ RPM | Vis-#4 | 10% $H_2O$ RPM | Vis-#4 | 12% $H_2O$ RPM | Vis-#4 | 14% $H_2O$ RPM | Vis-#4 |
|---|---|---|---|---|---|---|---|---|
| Methanol | 6 | 90,200 | 1.5 | 338,800 | 1.5 | 284,000 | 1.5 | 384,000 |
|  | 3 | 91,400 | .6 | 335,000 | .6 | 278,000 | .6 | 386,000 |
|  | 1.5 | 84,000 | .3 | 340,000 | .3 | 260,000 | .3 | 380,000 |

| | RPM | Vis-#2 | RPM | Vis-#2 | RPM | Vis-#2 | RPM | Vis-#2 |
|---|---|---|---|---|---|---|---|---|
| Hexanol | 30 | 738 | 30 | 774 | 30 | 860 | 30 | 914 |
|  | 12 | 735 | 12 | 775 | 12 | 860 | 12 | 915 |
|  | 6 | 690 | 6 | 750 | 6 | 840 | 6 | 890 |

*95% xylene/5% Alcohol (V/V) containing 5% by weight of sulfonated Polystyrene (2 mole percent sodium sulfonate) was employed as starting solution.

TABLE 2
VISCOSITIES OF SULFONATED ETHYLENE/PROPYLENE DIENE TERPOLYMER SOLUTIONS* AT VARIOUS WATER CONTENTS IN TWO SOLVENT SYSTEMS

| Alcohol/Solvent | 0% $H_2O$ | | 6% $H_2O$ | | 8% $H_2O$ | | 10% $H_2O$ | | 12% $H_2O$ | |
|---|---|---|---|---|---|---|---|---|---|---|
| | RPM | Vis-#4 | RPM | Vis-#4 | RPM | Vis-#4 | RPM | Vis-#4 | RPM | Vis-#4 |
| ISOPROPANOL/ HEPTANE | 60 | ERRATIC READINGS | 60 | 3,200 | 60 | 6,500 | 30 | 16,040 | 12 | 33,900 |
|  | 3 |  | 30 | 3,600 | 30 | 6,500 | 12 | 20,500 | 6 | 47,500 |
|  |  |  | 12 | 5,500 | 12 | 9,500 | 6 | 28,400 | 3 | 70,000 |
| | RPM | Vis-UL | RPM | Vis-#4 | RPM | Vis-#4 | RPM | Vis-#4 | RPM | Vis-#4 |
| METHANOL/ XYLENE | 30 | 116 | 12 | 32,000 | 6 | 83,500 | .6 | 712,000 | | Too Gelled |
|  | 12 | 123 | 6 | 43,500 | 3 | 117,000 | .3 | 824,000 |  |  |
|  | 6 | 123 | 3 | 64,000 | 1.5 | 170,000 |  |  |  |  |

*SULFONATED EPDM CONTAINED about 1 mole percent zinc sulfonate or about 30 milliequivalents sulfonate/100 gms. polymer and was dissolved at a level of 5 weight percent in 95/5 solvent/alcohol mixture.

EXAMPLE 2

A hydrocarbon solution of a sulfonated EPDM (20 meq. Zn sulfonate) is prepared by dissolving 5 parts by weight of polymer in 100 parts of solvent (xylene: 95% volume % and methanol: 5 volume %). The solution has a viscosity of about 100 centipoises. A container is filled to a depth of one inch of clean, dry sand. Sufficient polymer solution is added to the sand to create a hydrocarbon wet surface about ½ inch thick. Water is then added to this system with the result that water does not readily permeate the sand but remains on top. The sand layer on the bottom remains dry for several hours. After that time it is observed that the sand layer on top has become a strong elastic layer to a depth of ½ inch as the cosolvent is extracted. Finally, the bottom layer is water wet primarily through breakthrough at the perimeter of the container. It is evident that a tough elastomer coating impregnated with sand has been created with this process. Such a process is ideally suited for the rapid preparation of water impermeable liners for ponds, reservoirs, etc.

EXAMPLE 3

The hydrocarbon polymer solution of Example 2 is prepared. When a drop of the solution is placed on the surface of a container of water it is converted to a tough elastomer coating but does not form a smooth coating, but rather a glob. A surfactant (Tween 20) is added to the polymer solution (0.5% by weight) and the experiment repeated. Upon the addition of from 1 to 5 drops of solution, the hydrocarbon solution immediately flows to cover the entire water surface and becomes an extremely thin elastomeric film with surprising integrity. The film is sufficiently thin to be transparent but can be removed as an elastomeric film. The entire surface of the vessel is uniformly coated via this manner.

What is claimed is:

1. An elastic film formed from a water insoluble gel of a neutralized sulfonated polymer, said gel having a viscosity of at least 50,000 cps.

2. A film according to claim 1, wherein said neutralized sulfonated polymer, is an EPDM terpolymer having about 10 to 200 meq. of sulfonate groups per 100 grams of sulfonated polymer.

3. A high strength grease formed from a water insoluble gel of a neutralized sulfonated elastomeric polymer, said gel having a viscosity of at least 50,000 cps.

4. A grease according to claim 3 wherein said neutralized elastomer polymer is a neutralized sulfonated EPDM terpolymer having about 10 to 200 meq. of sulfonate groups per 100 grams of sulfonated polymer.

5. A grouting material formed from a water insoluble gel of a neutralized sulfonated elastomeric polymer said gel having a viscosity of at least 50,000 cps.

6. A grouting material according to claim 5, wherein said neutralized elastomer polymer is a neutralized sulfonated EPDM terpolymer having about 10 to 200 meq. of sulfonate groups per 100 grams of sulfonated polymer.

7. A substrate stabilization process which comprises the impregnation in and depositing on a surface of a substrate a layer of a polymeric solution of a neutralized sulfonated polymer dissolved in a mixed solvent system of an organic liquid and a polar cosolvent, said organic liquid being selected from the group consisting of aromatic hydrocarbons, cyclic aliphatic ethers, aliphatic ethers and organic aliphatic esters and mixtures thereof, said solvent system containing less than 15 wt.% of polar cosolvent, a viscosity of said solvent system being less than about 1000 cps. said solution containing about 0.1 to about 20 wt.% of said neutralized sulfonated polymer, said neutralized sulfonated polymer having about 10 to about 200 meq of neutralized sulfonate groups; and depositing sufficient water onto said layer of said polymer solution to transform said polymeric solution into an water insoluble elastomeric layer.

8. A process according to claim 1, wherein said substrate is sand or a soil formation.

9. A coating process which comprises the impregnation in and depositing on a surface of a substrate a layer of a polymeric solution of a neutralized sulfonated EPDM terpolymer dissolved in a mixed solvent system of an organic liquid and a polar cosolvent, said organic liquid being selected from the group consisting of aromatic hydrocarbons, cyclic aliphatic ether, aliphathic ethers and organic aliphathic esters and mixture thereof, said solvent system containing less than 15 wt.% of polar cosolvent, a viscosity of said solvent system being less than about 1000 cps. said solution containing about 0.1 to about 20 wt.% of said neutralized sulfonated EPDM terpolymer, said neutralized sulfonated EPDM terpolymer having about 10 to about 200 meq. of neutralized sulfonate groups and depositing sufficient water onto said layer of said polymer solution to transform said polymeric solution into an water insoluble elastomeric layer.

10. A coating process which comprises the step of depositing onto the surface of water a polymeric solution of a neutralized sulfonated EPDM terpolymer dissolved in a mixed solvent system of an organic liquid and a polar cosolvent, said organic liquid being selected from the group consisting of aromatic hydrocarbons, cyclic aliphatic ethers, aliphathic ethers and organic aliphathic esters and mixtures thereof, said solvent system containing less than 15 wt.% of polar cosolvent, a viscosity of said solvent system being less than about 100 cps. said solution containing about 0.1 to about 20 wt.% of said neutralized sulfonated EPDM terpolymers, terpolymer having about 10 to about 20 meq. of neutralized sulfonate groups, said water interacting with said polymeric solution thereby transforming said polymeric solution into an water insoluble elastomeric film on said surface of said water.

11. A process according to claim 7, wherein said elastomeric film is reverted to said polymeric solution by the further addition of said cosolvent.

12. A process according to claim 9, wherein said elastomeric film is reverted to said polymeric solution by the further addition of said cosolvent.

13. A process according to claim 10, wherein said elastomeric film is reverted to said polymeric solution by the further addition of said cosolvent.

14. A water insoluble elastic film according to claim 1, wherein said film is formed on an aqueous substrate.

* * * * *